(12) United States Patent
Maimon et al.

(10) Patent No.: US 12,519,478 B2
(45) Date of Patent: Jan. 6, 2026

(54) EFFICIENCY ENHANCED CIRCUIT DIGITAL-TO-ANALOG CONVERTER (CDAC) BY OPTIMIZED Q OF THE OFF-LOAD

(71) Applicant: Intel Corporation, Santa Clara, CA (US)

(72) Inventors: Tzvi Maimon, Haifa (IL); Ofir Degani, Haifa (IL); Assaf Ben-Bassat, Haifa (IL); Anna Nazimov, Haifa (IL)

(73) Assignee: Intel Corporation, Santa Clara, CA (US)

( * ) Notice: Subject to any disclaimer, the term of this patent is extended or adjusted under 35 U.S.C. 154(b) by 684 days.

(21) Appl. No.: 17/763,224

(22) PCT Filed: Dec. 26, 2019

(86) PCT No.: PCT/US2019/068552
§ 371 (c)(1),
(2) Date: Mar. 24, 2022

(87) PCT Pub. No.: WO2021/133394
PCT Pub. Date: Jul. 1, 2021

(65) Prior Publication Data
US 2022/0407529 A1    Dec. 22, 2022

(51) Int. Cl.
*H03M 1/00*    (2006.01)
*H04B 1/04*    (2006.01)

(52) U.S. Cl.
CPC .............. *H03M 1/002* (2013.01); *H04B 1/04* (2013.01)

(58) Field of Classification Search
CPC ................................ H03M 1/002; H04B 1/04
See application file for complete search history.

(56) References Cited

U.S. PATENT DOCUMENTS

| 4,947,169 A * | 8/1990 | Smith ................. H03M 1/1057 341/120 |
| 10,284,166 B2 | 5/2019 | Sira |

(Continued)

OTHER PUBLICATIONS

Passamani, Antonio et al., "Analysis and design of a 1.1dB-IL third-order Matching Network for Switched-Capacitor PAs" IEEE, dated Oct. 26-28, 2015,4 pages, 2015 Nordic Circuits and Systems Conference (NORCAS): NORCHIP & International Symposium on System-on-Chip (SoC), Oslo, Norway.

(Continued)

*Primary Examiner* — Junpeng Chen
(74) *Attorney, Agent, or Firm* — Viering, Jentschura & Partner mbB (57) ABSTRACT

A communication device includes a power amplifier that generates power signals according to one or more operating bands of communication data, with the amplitude being driven and generated in output stages of the power amplifier. A number of capacitive digital analog converter (CDAC) cells of a power amplifier can be sized to provide defined power signals along a signal path. In response to an optimization component that is coupled to a CDAC cell of the plurality of CDAC cells operating in a high efficiency enable mode and the CDAC cell being powered off in an off mode, the optimization component can increase a power efficiency of the power amplifier by reducing an impedance of an output capacitor of the CDAC cell.

13 Claims, 8 Drawing Sheets

(56) References Cited

U.S. PATENT DOCUMENTS

2008/0238748 A1* 10/2008 Wu ..................... H03M 1/0617
                                                        341/146
2018/0375488 A1* 12/2018 Sira ..................... H04B 1/0458
2019/0166325 A1*  5/2019 Kim ..................... H04N 25/771
2019/0268013 A1*  8/2019 Furubayashi ....... H03F 3/45959

OTHER PUBLICATIONS

Tseng, Wei-Hsin et al., "A 12-bit 104 MS/s SAR ADC in 28 nm CMOS for Digitally-Assisted Wireless Transmitters", IEEE, Oct. 2016, pp. 2222-2231, IEEE Journal of Solid-State Circuits, vol. 51, Issue 10.

International Search Report issued for the corresponding international patent application No. PCT/US2019/068552, dated Nov. 11, 2020, 5 pages (for informational purposes only).

* cited by examiner

EFFICIENCY ENHANCED CIRCUIT DIGITAL-TO-ANALOG CONVERTER (CDAC) BY OPTIMIZED Q OF THE OFF-LOAD

CROSS-REFERENCE TO RELATED APPLICATIONS

This is a national phase application under 35 CFR 371 of PCT Application PCT/US2019/068552, which was filed on Dec. 26, 2019, the entirety of which is incorporated herein by reference.

BACKGROUND

Modern wireless systems utilize multi-band and multi-mode operations to simultaneously support multiple different communication standards. These rapidly growing demands have posed tremendous challenges for future radio frequency (RF) transmitter development and especially power amplifiers (PA). One popular solution for multi-band PAs is to directly assemble several single-band PAs either in a chip or on a multiple-chip module. This approach, however, can have several drawbacks, such as large chip/module area, increased cost, dedicated antenna interface to each PAs, possible need of off-chip switches and complicated packaging, as well as loss of power efficiency. Tunable passive networks can also be utilized to achieve multi-band impedance matching and power combining for RF PAs. Those tunable components often pose a direct trade-off among passive loss and frequency range and suffer from reliability concerns of tunable components such as varactors and a switch-cap banks, especially with respect to power efficiency.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, an electronic circuit and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

In consideration of the above described deficiencies and continued objectives, various aspects for an apparatus of a communication system can include a power amplifier with a plurality of capacitive digital analog converter (CDAC) cells configured to provide a power signal to a signal path. An optimization components, coupled to one or more CDAC cells, can be configured to alter a Quality (Q) Factor of an output capacitor of the one or more CDAC cells in an off mode, while other CDAC cells of the plurality of CDAC cells operate in an on mode based on a particular driver size to generate the power signals along the path, for example.

The optimization component, for example, can increase a power efficiency by reducing an impedance of the CDAC cell, in response to being in a high efficiency mode of operation and the CDAC cell being powered off. The optimization component can include two component parts: a first enhancement component and a second enhancement component. The first enhancement component is connected to a first differential signal path at a first charge node connected to an input of a first output capacitor and at a first logic device. The second enhancement component is connected to a second differential signal path at a second charge node connected to an input of a second output capacitor.

In CDAC configurations, the last driver size is optimized for a best efficiency, the problem however is that there is a trade-off between the driver size utilized for the Off cells (e.g., Off CDAC cells among the plurality CDAC cells) to the driver size of the ON CDAC cells. As such, embodiments herein enable a separate optimization for each mode of operation and results in significant power efficiency improvement compared to regular CDAC configurations, or operation of the CDAC cells without the optimization component, for example. Additional aspects and details of the disclosure are further described below with reference to figures.

Figure 1:
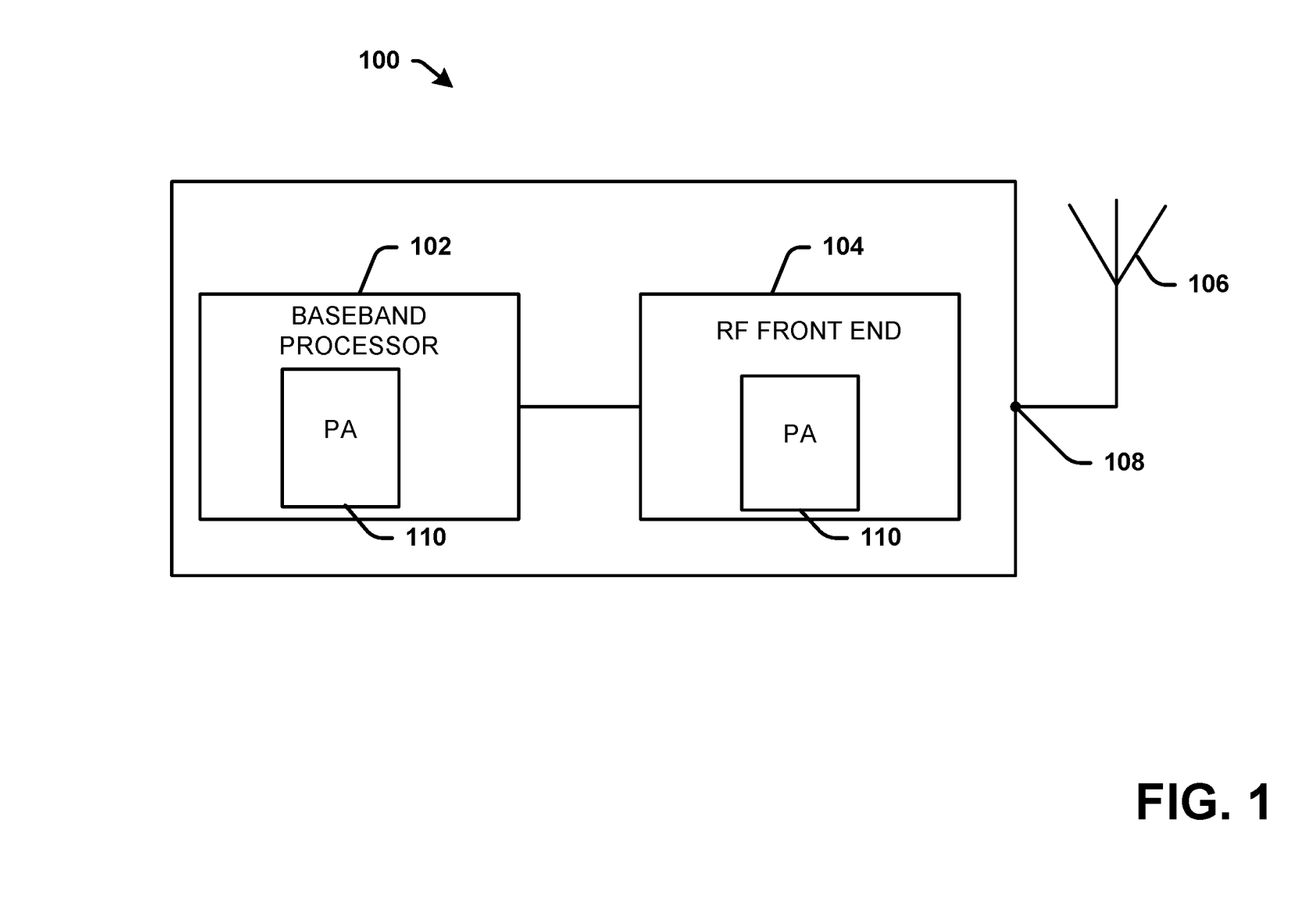
FIG. 1 illustrates an exemplary communication device comprising at least an exemplary power amplifier in accordance with various aspects described.

Referring to FIG. 1, illustrated is an exemplary communication or mobile device 100 comprising a power amplifier in accordance with various aspects being described. The communication device 100 can comprise a mobile or wireless device, for example, and can further include a digital baseband processor 102, an RF frontend 104 and an antenna port 108 for connecting to an antenna 106. The device 100 can comprise an exemplary power amplifier 110 as a part of the digital baseband processor 102 or the RF frontend 104. The digital baseband processor 102 or the RF frontend 104 can comprise such a power amplifier 110 or multiple power amplifiers operating or coupled in parallel. The RF frontend 104 can be coupled to the digital baseband processor 102 and the antenna port 108, which is configurable with the antenna 106.

In one aspect, the power amplifier 110 can operate to provide a power signal along a transmitter path/signal path for transmissions according to various operating bands. The power amplifier 110 can operate in multi-band or multi-mode operations to simultaneously support multiple communication standards with various operating bands. Rapidly growing demands have posed challenges for future radio frequency (RF) transmitter development, especially power amplifiers. One solution for a multi-band power amplifier can be to directly assemble several single-band PAs either in a chip or on a multiple-chip module. However, this can possibly incur large chip/module area, increased cost, a dedicated antenna interface to each power amplifier, possibly the need for off-chip switches or complicated packaging.

Additionally, tunable passive networks can also be utilized to achieve multi-band impedance matching and power combining for RF power amplifiers. However, these solutions suffer from the direct trade-off among passive loss and power efficiency concerns. To address at least some of these issues, the power amplifier 110 can comprise an optimization component configured in parallel to one or more capacitive digital analog converter (CDAC) cells from among multiple CDACs dynamically being activated and inactivated depending on a digital code signal being received, for example.

In one example, the power amplifier 110 can comprise a plurality of power amplifiers components or unit power amplifier cells or CDAC cells (e.g., 204 of FIGS. 2, 3), for example, each configured to provide the power signal along the transmitter path/signal path (e.g., path to antenna port 108) based on driver signals being received according to one or more operating bands or frequencies. The CDAC cells thus can be integrated as the power amplifier 110. Alternatively, or additionally, the CDAC cells (e.g., 204 of FIGS. 2, 3) disclosed herein can comprise an output connected an antenna or power amplifier 110, for example; and thus, the CDAC cells be the power amplifier 110 or connected to an external power amplifier. The power amplifier 110 can be further integrated to an output passive network, which can be a matching network component (e.g., transformer 220 of FIGS. 2, 3). This output stage can combine power signals processed from the different unit power amplifier cells/components of the power amplifier 110.

Each of the CDAC cells includes an output capacitor that can be connected to the output network, for example. While some cells are activated, others are deactivated/powered off, and any number of activated/deactivated cells could be configured depending on the given driver size. The power amplifier 110 can configure a trade-off between the driver size demanded in the OFF cells to the driver size of the ON cells for driving a power signal. Each mode however can be optimized with optimization components in parallel to each signal path, single or differential paths, to increase power efficiency. Efficiency, in particular, can be one of the main key performance indicators (KPIs) in a transmission chain/path. As such, optimization components configured in parallel to each signal path, either a single path or at each differential path (e.g., first/second paths, or the like).

For example, the optimization provided at each CDAC cell can enable a 10% efficiency improvement in the transmit chain or signal path. This can lead to a significant power reduction, for example. When in a high efficiency mode of operation, as discussed herein (e.g., via a power efficiency threshold or a particular Quality (Q) Factor for the output capacitor), a 6 dB to 15 dB back-off from a maximum power or Pmax can be realized. Smaller advantages can also be seen out of this range as well. Therefore, operating in high efficiency modes when the high efficiency enable signal is provided at an input with an optimization component compared to not utilizing such modes with the optimization component can give a considerable difference in power efficiency such as about 10 dB to 18 dB from maximum power or Pmax, or 3 dB to 15 dB back-off from Pmax, for example.

Figure 2:
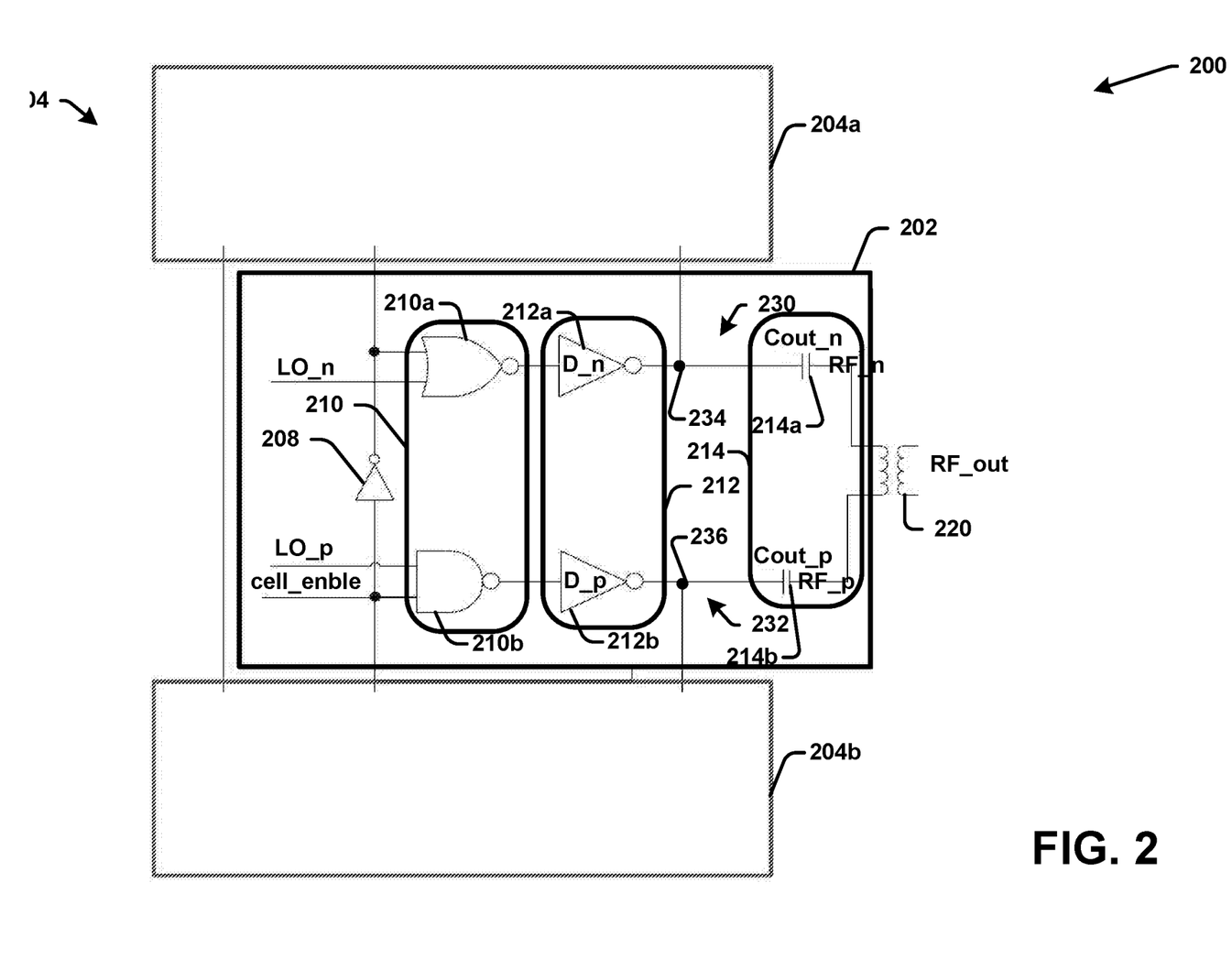
FIG. 2 illustrates an exemplary capacitive digital analog converter (CDAC) cell in accordance with various aspects described.

Referring to FIG. 2, illustrated is an example communication system with any number of CDAC cells 202 forming a power amplifier (PA) in accordance with various aspects or embodiments. The PA (e.g., 110) can comprise a CDAC cell or a plurality of CDAC cells 202 coupled in parallel to an optimization component 204.

The CDAC cell 202 can include a logic device component 210 coupled to a driver component 212 and an output capacitor circuit 214. Although only one component respectively from among components 210, 212, and 214 are illustrated each of which can represent multiple components of the same that can be dynamically coupled as one or more components, respectively, forming one or more CDACs 202 for generating a power signal. Each of the plurality of CDACs 202 connects to an output network with a single transformer 220.

Any number of CDACs 202 can include a single path as a transmit path or signal path or differential paths. Although a differential path is illustrated with CDAC 202, a single path could also be envisioned. Along a first differential path 230 includes a first logic gate device 210a of the logic device component 210, a first driver 212a of the driver component 212, and a first output capacitor 214a of the output capacitor circuit 214. Likewise, along a second differential path 232 includes a second logic gate device 210b of the logic device component 210, a second driver 212b of the driver component 212, and a second output capacitor 214b of the output capacitor circuit 214.

The logic device component 210 can include logic gates comprising at least one NOR gate 210a and at least one NAND gate 210b. In response to a cell_enable signal, a CDAC 202 could be activated or powered on into an On mode of operation, and at least one signal, such as a phase modulated local oscillator signal (LO_n, LO_p) further being received at one of the two inputs of the logic gates for pmos and nmos paths. The cell_enable input of the logic gates can be coupled together via an inverter 208 and further connected to at least one component of the optimization component 204.

The logic device components 210a and 210b can provide outputs at variable phases, for example, based on a digital code being received. The number of driver components 212 or CDAC cells 202 activated at any one time can vary depending on the digital code so that while a subset of CDACs 202 are activated and another subset of the CDACs 202 are in Off Mode as powered off or being powered off. Thus, the number of CDACs 202 activated in on mode or in an off mode can be modified to a different mix of on and off CDACs forming a variable driver stage in the PA. The power-off phase or Off mode can be referred to as a back-off mode where power is being decreased or the output power network of the unit PA cell components of the CDAC 202 is powered down or off.

The output capacitor circuit 214 can include any number of other components, or circuit components coupled together with at least one output capacitor 214a and at least one output capacitor 214b connected within each transmit path to the single transformer 220. Each output capacitor 214a and 214b of each CDAC 202 can be connected to a charge node (e.g., 234, 236) that connects to at least one component 204a/204b of the optimization component 204 in the respective CDAC cell 202, respectively.

The optimization component 204 is configured to reduce an impedance of the one or more CDAC cells in response to being in a high efficiency mode and the CDAC cell 202 being in the Off mode or being powered off. As such, the optimization component 204 can alter the Quality (Q) Factor of the output capacitor 214a/214b of the CDAC cell 202 by reducing the impedance of the one or more CDAC cells when the optimization component is signalled to be in a high efficiency mode and the CDAC cell 202 is in the off mode based on the cell_enable signal as a trigger or non-trigger.

Each optimization component 204 can be connected to one of the CDAC cells 202 in a parallel configuration. For example, the optimization component 204 can include a first enhancement component 204a and a second enhancement component 204b in parallel respectively along corresponding first and second differential paths 230, and 232. Each of the first and second enhancement components 204a and 204b can also be coupled to one another in a separate connection in addition to being connected in parallel to corresponding differential signal paths 230, 232. The first enhancement component 204a can be connected to the charge node 234, which is connected to the output capacitor 214a, and also connected to an input of the logic device 210a along the differential path 230. The second enhancement component 204b can be connected to the charge node 236, which is connected to the output capacitor 214b and also connected to an input of the logic device 210b along the differential path 232. Both the first and the second enhancement components 204a and 204b can then be coupled to the drivers 212a and 212b via the charge nodes 234, 236 and the logic devices 210a and 210b, respectively. Thus, the output of each logic device 210a and 210b connects to the input of each driver 212a and 212b, respectively.

Figure 3:
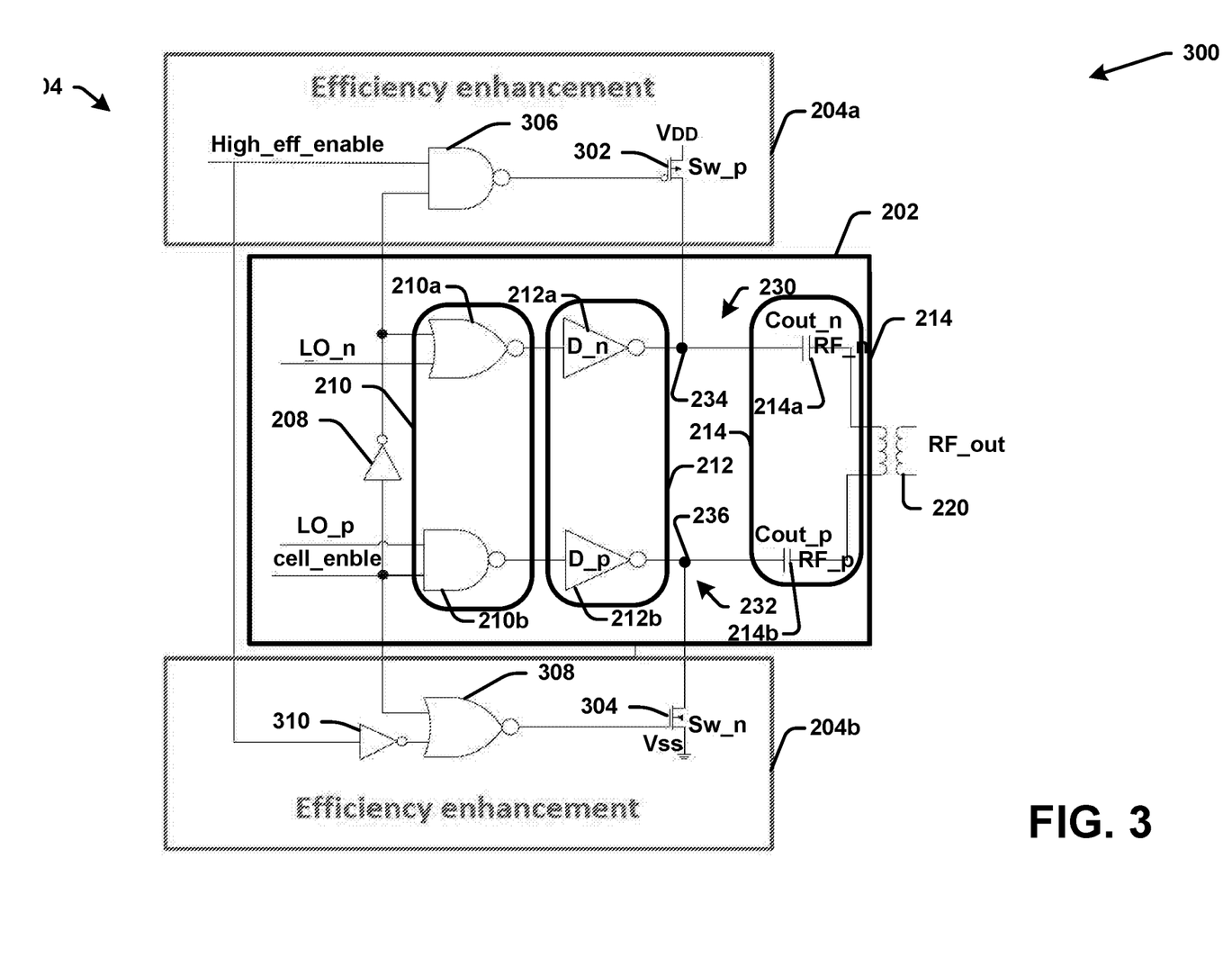
FIG. 3 illustrates another example capacitive digital analog converter (CDAC) cell coupled to a single transformer in accordance with various aspects described.

Referring to FIG. 3, illustrated is a further example of a power amplifier device for a communication system comprising CDAC cells for driving a power output with improved efficiency based on a high efficiency mode and an on/off mode of operation with an optimization component. In particular, the optimization component 204 comprises the first and second enhancement components 204a and 204b, each comprising at least one switch or transistor 302, 304 and a logic gate device 306, 308.

Figure 4:
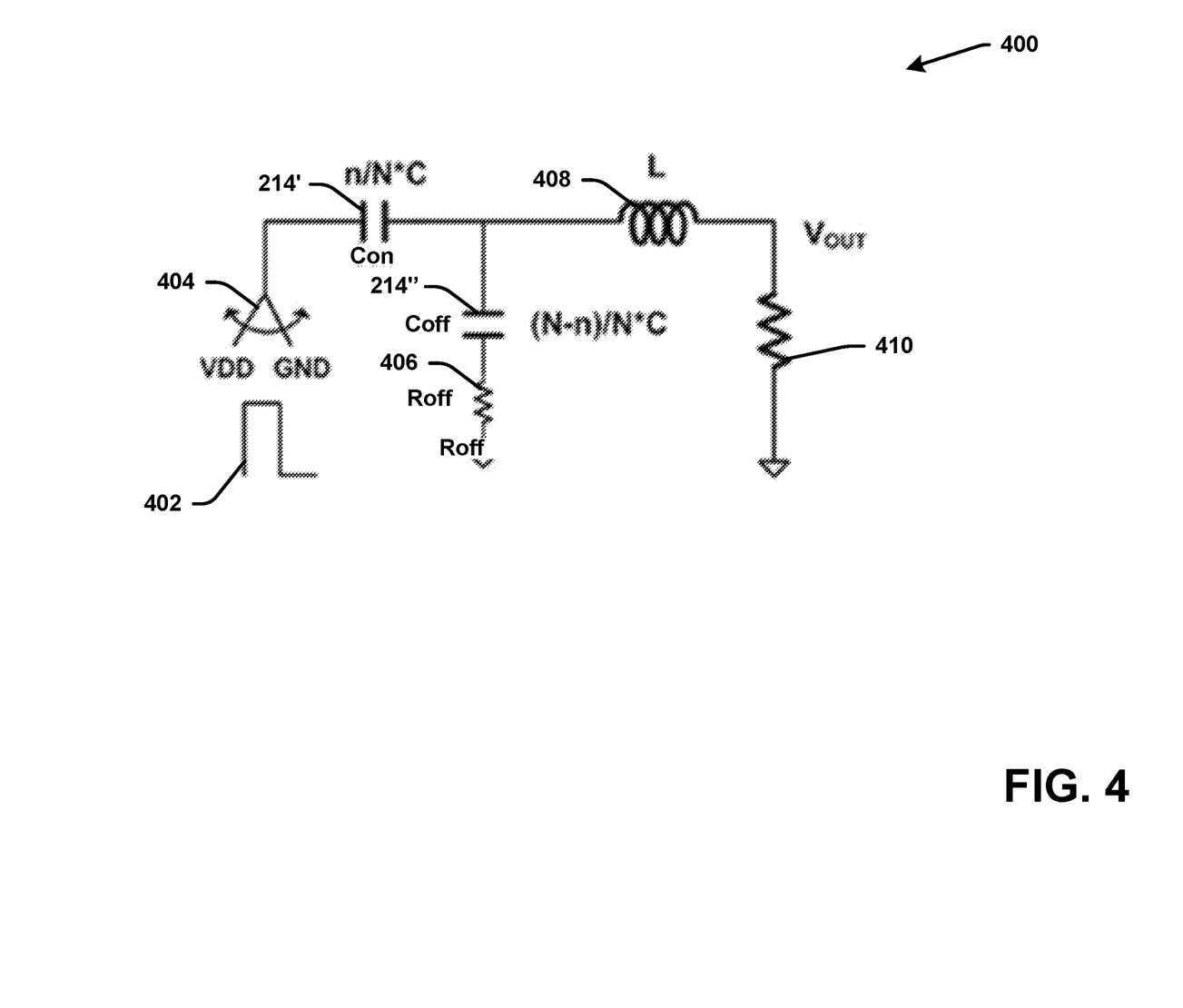
FIG. 4 illustrates an example circuit model of a CDAC cell in accordance with various aspects described.

Referring briefly to FIG. 4 for illustration in conjunction with FIG. 3 for description and applicable to embodiments and aspects herein, illustrated is an example CDAC model circuit 400. A digital code 402 triggers a supply voltage Vdd or ground 404 coupled to the output capacitor 214 in an On mode as Con 214' and in an Off mode as Coff 214". In the CDACs 202 there can be N=$2^{num\ of\ bits}$ basic cells. The number of cells turned ON (n) among an array of CDACs/CDAC banks of the PA can be set by the digital code 402. A digital code (e.g., 402, or the like) can also set the amplitude at output (e.g., RF_n and RF_p) as illustrated in FIG. 3. All other (N-n) cells, other than the On (n) cells, can be in an OFF mode. These Off mode CDACs comprise output capacitors (e.g., 214a/214b) that operate with an impedance 406 as connected to a load to AC ground. When in On mode, the output capacitors 214 operate as connected to an inductor L 408 to the transformer and a normal Vout over resistor 410, for example.

A single basic cell of CDAC 202 can include drivers (D_n, D_p) as 212a/212b, and output capacitors (Cout_n, Cout_p) 214a/214b. The size of the drivers D_n and D_p 212a/212b can be optimized for efficiency, but while in the ON mode there is an optimal value for efficiency, and for the OFF mode the driver 212a/212b connects the output capacitors (Cout_n, Cout_p) 214a/214b as a load to AC ground (as modeled at 406 in FIG. 4), so driver size could be as big as possible to reduce Roff 406 (as shown in FIG. 4), an impedance of the capacitor.

In an aspect, the optimization component 204 with different enhancement components 204a and 204b is configured to reduce Roff 406 but while not affecting the optimized driver size established, predefined, or set by the digital code when the CDAC 202 cell is ON. The PMOS 'sw_p' transistor switch 302 added at the n output (RF_n) is ON when the high efficiency mode is enabled (e.g., signal High_eff_enable='1') and additionally the CDAC cell 202 is OFF (signal 'cell_enable'=0), as determined or detected by the logic device 306. In this way the Roff 406 can be reduced and power efficiency be increased across operation. When the CDAC cell 202 is ON (signal 'cell_enable'=1) the added pmos 'sw_p' 302 is OFF and the driving of the output cap 'Cout_n' is set only by the output driver 'D_n' 212a. The function of the 'sw_p' switch 302 changes dynamically with the code.

Likewise, the same operations can be performed with the P output path with an NMOS 'sw_n' 304 and another logic device 308 (e.g., a NOR gate coupled to a NOT logic gated in the second enhancement component 204b. Similarly in a second differential path of the CDAC 202 Roff or the impedance of the output capacitor 214b can be reduced while not affecting or causing any change in the optimized driver size established, predefined, or set by the digital code when the CDAC 202 cell is ON. The NMOS 'sw_n' transistor/switch 304 added at the p output (RF_p) is ON when the high efficiency mode is enabled (e.g., signal High_eff_enable) and additionally the CDAC cell 202 is OFF (signal 'cell_enable'=0), as determined or detected by the logic device 306. In this way the Roff 406 can be reduced and power efficiency be increased across operation. When the CDAC cell 202 is ON (via cell_enable) the added NMOS 'sw_n' 304 is OFF and the driving of the output cap 'Cout_p' is set only by the output driver 'D_p' 212a. The function of the 'sw_n' switch 302 changes dynamically with the digital code also.

As illustrated in FIG. 3, the optimization component 204 can be coupled in parallel to differential paths of the CDAC cell 202 via the first enhancement component 204a and the second enhancement component 204a (or referred to as first/second optimization components). The first and second enhancement components 204a/204b can be connected to the charge node 234, 236 and the output capacitor 214a, 214b, respectively. Inputs of each of the first and second enhancement components 204a/204b are connected together, via an inverter 310 at one input and the inverter 208 at another. Each input provides signals into the NAND gate 306 and the NOR gate 308 providing outputs along first and second optimization paths therein for operation of switches 302 and 304. The PMOS switch 302 connects a Vdd supply voltage to the output capacitor 214a in Off mode, and lowers impedance thereof when the CDAC cell is signaled as inactive or in Off mode, and the optimization component 204 is triggered for high efficiency mode by the high_eff_enable signal.

The first and second enhancement components 204a and 204b can be configured to alter the Q Factor of the output capacitor (214a, 214b) of the one or more CDAC cells 202 by reducing at least one of: an impedance to ground in the first optimization component (e.g., enhancement component 204b) or an impedance to supply (e.g., Vdd) in the second optimization component (e.g., enhancement component 204a) of the one or more CDAC cells 202 in response to being in a high efficiency mode and the one or more CDAC cells being in the off mode. Other cells of the CDAC cells can be in an On mode, while the first and second enhancement components 204a and 204b can operate dynamically with respect to each cell and each path.

The digital code (e.g., 402 of FIG. 4) can enable the high efficiency enable mode in the optimization component 204 and disable the CDAC cell 202 while enabling at least one other CDAC cell of the plurality of CDAC cells 202 for a particular driver size to generate the power signals along the signal path to not be changed. The optimization component 204 can also include one or more optimization components, coupled to the plurality of CDAC cells 202 that each are configured to alter or modify a Quality (Q) Factor of an output capacitor of one or more CDAC cells of the plurality of CDAC cells in an off mode, wherein other CDAC cells of the plurality of CDAC cells operate in an on mode. The dynamic code can thus operate to initiate the high efficiency mode based on one or more parameters, including a power efficiency threshold of the PA 110 or a Q factor of one or more output capacitors (e.g., 214a, 214b, or others) in one or more CDAC cells 202. As such, the optimization components 204 enable additional switches only in the off mode of a particular CDAC cell and it improves the Q of the loading of the capacitors only at the off mode of the CDAC cell, only when the cell is off, and is not active when this cell is on. It is not affecting the on cell state. This can be done automatically by the logic of an optimization component 204 and enable control that dynamically changes the switch mode.

Figure 5:
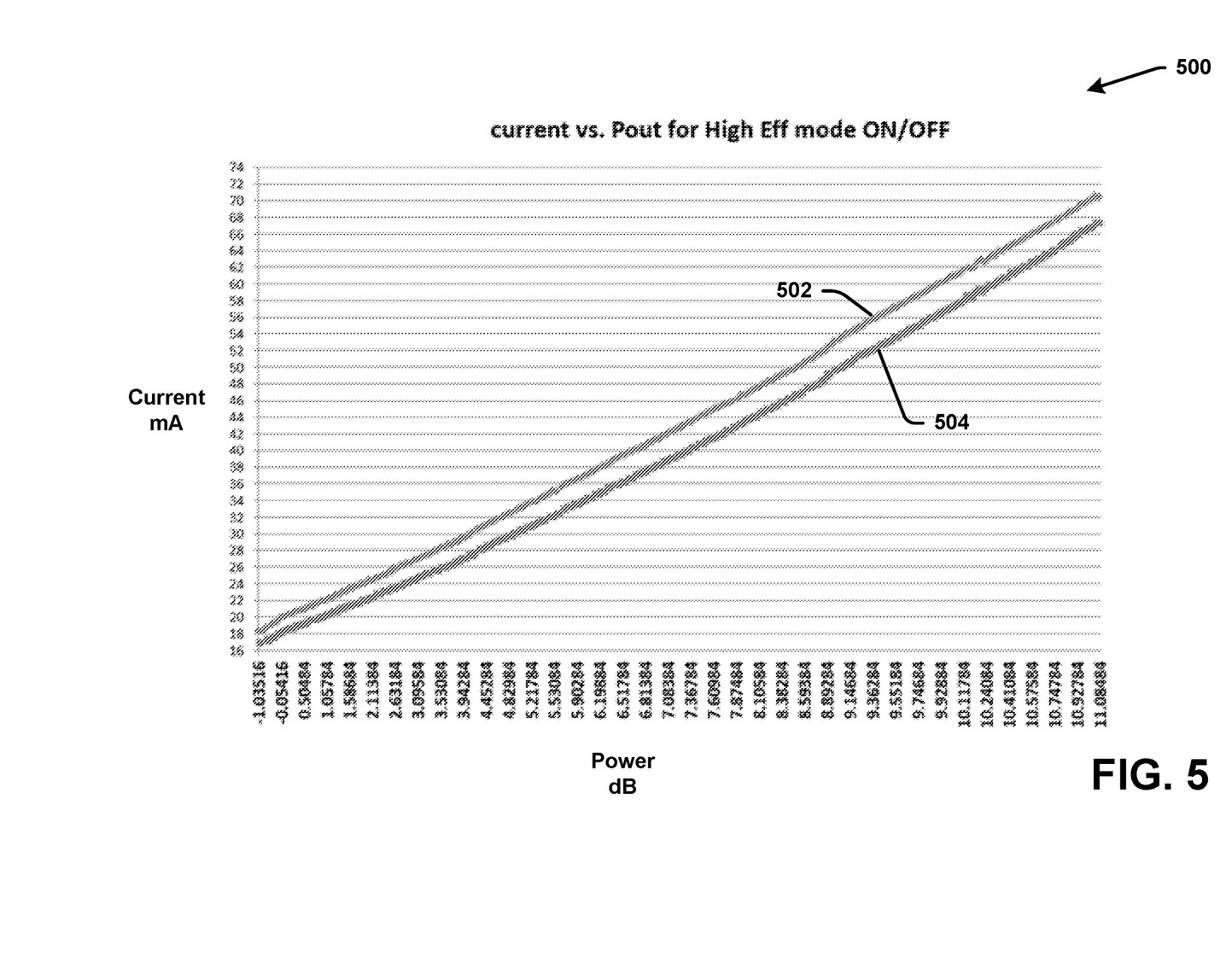
FIG. 5 illustrates a measurement graph related to an example power amplifier in accordance with various aspects described.

Referring to FIG. 5, illustrated is an example result of a measurement of optimization component operation in high efficiency mode of operation according to various aspects being described. The characteristics of behavior for the PA power output capacitance when observed in High Efficiency mode On by the curve 504 and High Efficiency mode Off by the curve 502 can be seen from the graph 500. The curve 502 demonstrates the differential between the total capacitance of the PA 110 during operation while the unit PA cells or CDAC cells are off while processing transmission with an optimization scheme via the optimization component 204.

A measured current versus output power with the high efficiency mode enable and disabled is demonstrated. The Pout is at a 3 dB to 15 dB back off power from Pmax (14 dBm), for example.

Figure 6:
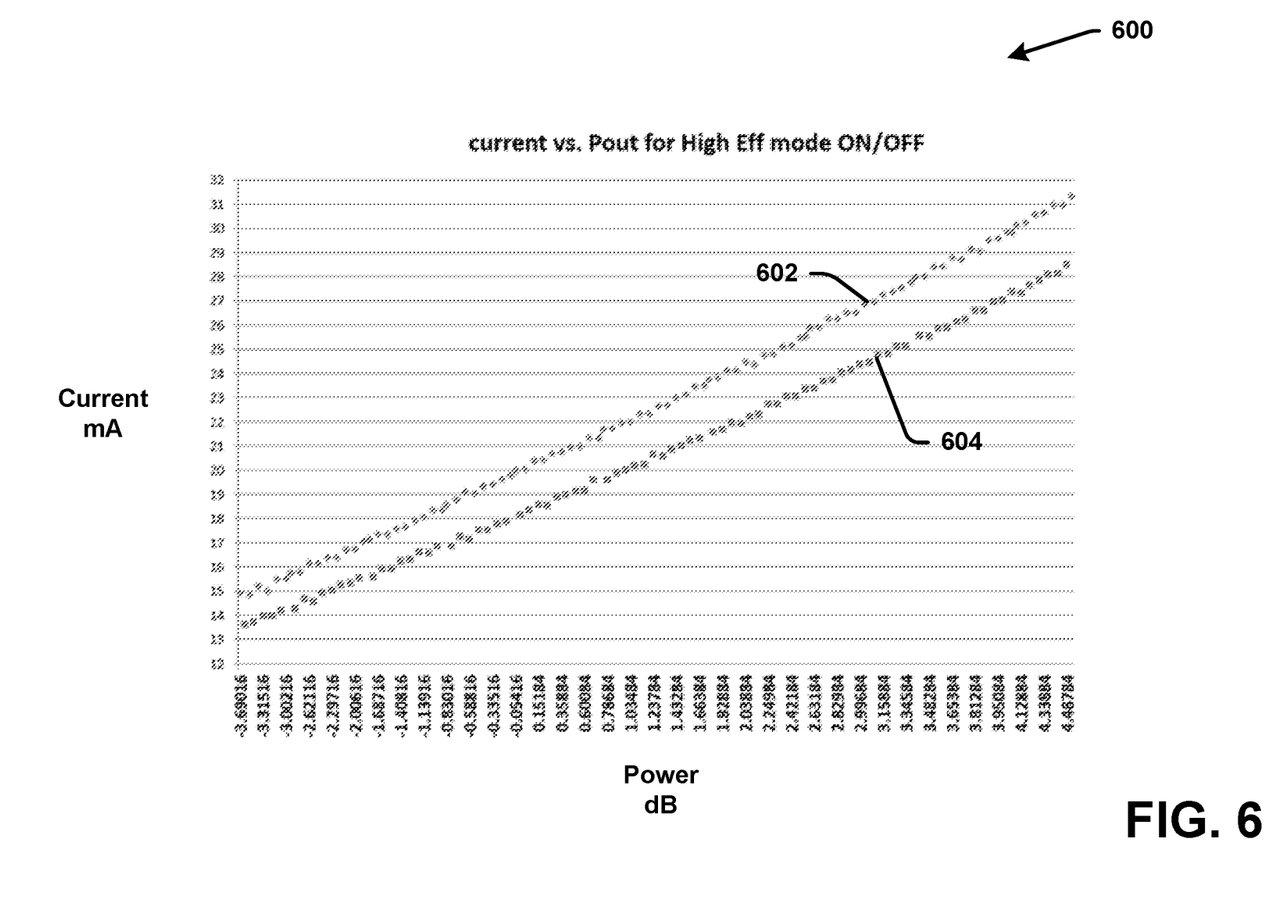
FIG. 6 illustrates another measurement graph related to an example power amplifier in accordance with various aspects described.

Referring to FIG. 6, illustrated is another example of a measurement of optimization component operation in high efficiency mode of operation. The graph 600 comprises curves 602 and 604 corresponding to an Off mode and an On mode in the high efficiency mode of operation and when the CDAC cell 202 is in an off mode or not enabled by the enable signal. Graph 600 is a zoomed in version of graph 500 of FIG. 5. As shown here, the Pout or output power is at 10 dB-18 dB back off from Pmax. The maximum current saving can be around 12 dB back off and a 10% current reduction in percentage based on operation in the high efficiency mode via the optimization component 204 (with enhancement components 204a, 204b).

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 7:
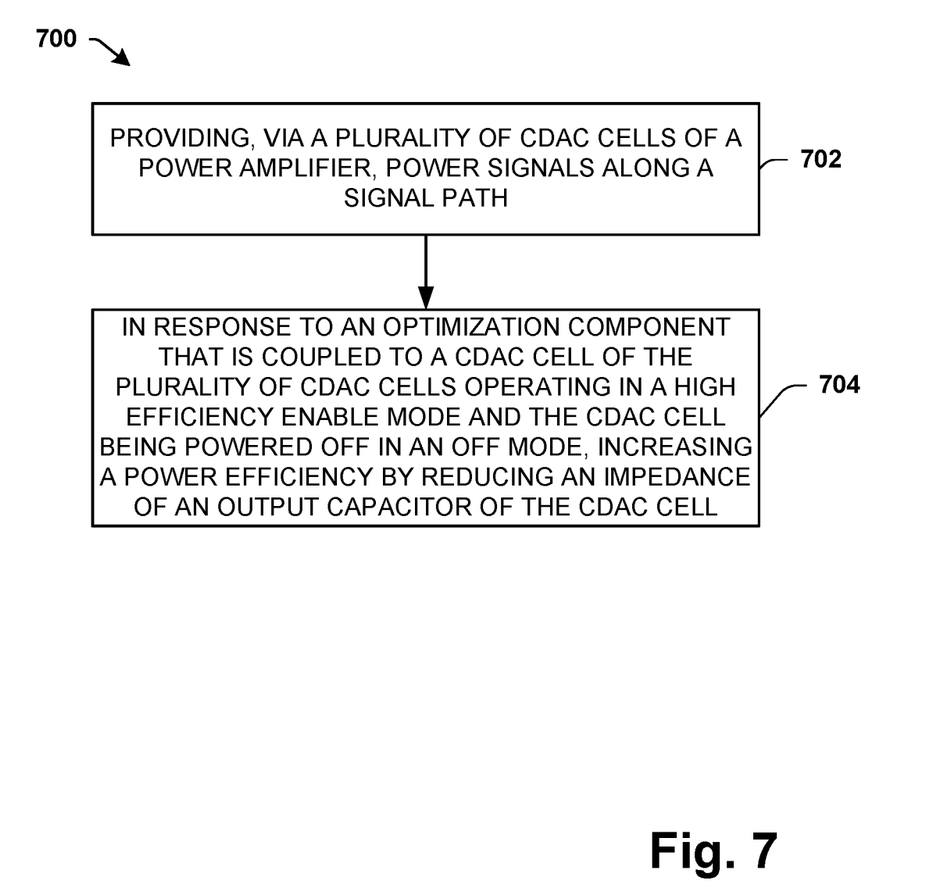
FIG. 7 illustrates a flow diagram of an exemplary method in accordance with various aspects described.

Referring to FIG. 7, illustrated is an example method for utilizing a PA circuit with optimization of the output capacitors when CDAC cells are in the off mode of operation for a communication device (e.g., a mobile device, or user equipment). The method 700 initiates at 702 with providing, via a plurality of capacitive digital analog converter (CDAC) cells of a power amplifier, power signals along a signal path.

At 704, the method further includes increasing a power efficiency by reducing an impedance of an output capacitor of the CDAC cell in response to an optimization component (e.g., 204) that is coupled to a CDAC cell of the plurality of CDAC cells with many capacitors (e.g., 1024 for a 10 bit CDAC) operating in a high efficiency enable mode and the CDAC cell being powered off in an off mode.

The method can further comprise receiving a high efficiency enable signal at a first logic gate (e.g., NAND gate) along a first optimization path (PMOS path) of the optimization component (e.g., input of switch 302 to output of logic device 306) while the CDAC cell 202 does not receive an enable signal at an input of a logic gate 210b of the CDAC cell 202, and an inverted signal at logic gate 210a by am inverter or NOT device 208. The efficiency mode initiates activating a first transistor switch 302 along the first optimization path (PMOS path) of the enhancement component 204a of the optimization component 204 to couple a supply voltage to a first charge node 234 coupled to the output capacitor 214 along a second differential path of the CDAC cell 202.

The method can further include receiving the high efficiency enable signal at a second logic gate 308 via an inverter 310 along a second optimization path (e.g., an NMOS path) of a second enhancement component 204b of the optimization component 204b while the CDAC cell 202 does not receive the enable signal in an off mode. The efficiency mode initiates activating a second transistor switch 304 along the second optimization path (NMOS path) of the optimization component 204 to couple a ground to a second charge node 236 that is coupled to another output capacitor 214b along a second differential path of the CDAC cell 202.

The processes of method 700 can operate the high efficiency mode of the optimization component 204 when the CDAC cell 202 is in Off mode based on dynamically receiving a digital code that enables the high efficiency enable mode in the optimization component 204 and disables the CDAC cell while enabling at least one other CDAC cell of the plurality of CDAC cells for a particular driver size to generate the power signals along the signal path, for example. Thus, the number of CDAC cells can be dynamically activated in real time and utilize the high efficiency mode dynamically for some CDAC cells that are concurrent operating in off mode or inactive or being powered off.

Figure 8:
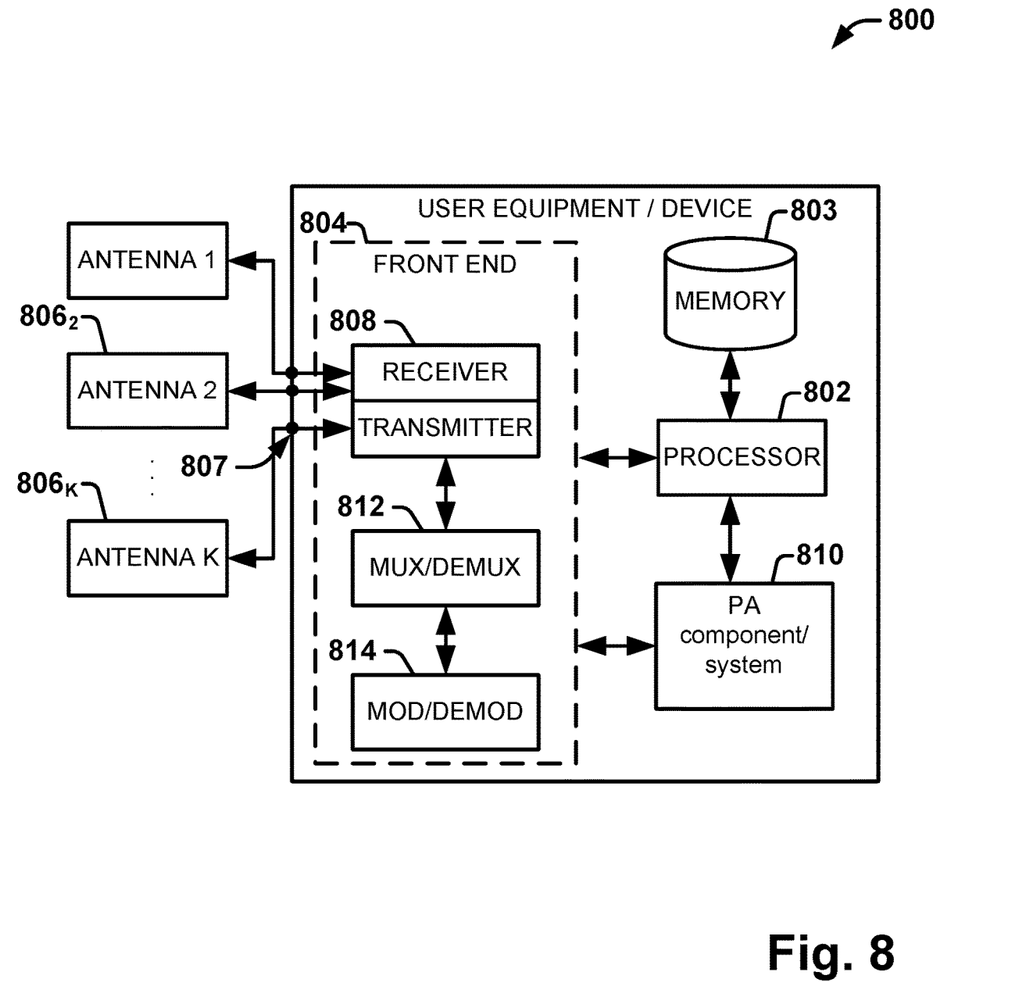
FIG. 8 illustrates an exemplary mobile communication device having a power amplifier component system in accordance with various aspects described.

To provide further context for various aspects of the disclosed subject matter, FIG. 8 illustrates a block diagram of an embodiment of access equipment, user equipment (e.g., a mobile device, communication device, personal digital assistant, etc.) or software 800 related to access of a network (e.g., base station, wireless access point, femtocell access point, and so forth) that can enable and/or exploit features or aspects of the disclosed aspects.

The user equipment or mobile communication device 800 can be utilized with one or more aspects of the converter systems or devices described according to various aspects herein. The mobile communication device 800, for example, comprises a digital baseband processor 802 that can be coupled to a data store or memory 803, a front end 804 (e.g., an RF front end, an acoustic front end, or the other like front end) and a plurality of antenna ports 807 for connecting to a plurality of antennas $806_1$ to $806_k$ (k being a positive integer). The antennas $806_1$ to $806_k$ can receive and transmit signals to and from one or more wireless devices such as access points, access terminals, wireless ports, routers and so forth, which can operate within a radio access network or other communication network generated via a network device (not shown). The user equipment 800 can be a radio frequency (RF) device for communicating RF signals, an acoustic device for communicating acoustic signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 804 can include a communication platform, which comprises electronic components and associated circuitry that provide for processing, manipulation or shaping of the received or transmitted signals via one or more receivers or transmitters 808, a mux/demux component 812, and a mod/demod component 814. The front end 804, for example, is coupled to the digital baseband processor 802 and the set of antenna ports 807, in which the set of antennas $806_1$ to $806_k$ can be part of the front end. In one aspect, the mobile communication device 800 can comprise a PA component/system 810 according to embodiments/aspects described herein.

The user equipment device 800 can also include a processor 802 or a controller that can operate to provide or control one or more components of the mobile device 800. For example, the processor 802 can confer functionality, at least in part, to substantially any electronic component within the mobile communication device 800, in accordance with aspects of the disclosure. As an example, the processor can be configured to execute, at least in part, executable instructions that control various modes or components of the PA component/system 810 (e.g., the system 110, 200, 300).

The processor 802 can operate to enable the mobile communication device 800 to process data (e.g., symbols, bits, or chips) for multiplexing/demultiplexing with the mux/demux component 812, or modulation/demodulation via the mod/demod component 814, such as implementing direct and inverse fast Fourier transforms, selection of modulation rates, selection of data packet formats, inter-packet times, etc. Memory 803 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

The processor 802 is functionally and/or communicatively coupled (e.g., through a memory bus) to memory 803 in order to store or retrieve information necessary to operate and confer functionality, at least in part, to communication platform or front end 804, the PA component/system 810 and substantially any other operational aspects described herein.

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:
1. A mobile communication device comprising:
  a plurality of a capacitive digital analog converter (CDAC) cells configured to provide a power signal to a signal path; and
  an optimization component, coupled to a CDAC cell of the plurality of CDAC cells, configured to increase a power efficiency by reducing an impedance of the CDAC cell, in response to being in a high efficiency mode of operation and the CDAC cell being powered off, wherein in the plurality of CDAC cells are coupled to a transformer with a change in a Quality Factor based on a high efficiency mode of the optimization component.

2. The mobile communication device of claim 1, wherein the optimization component is configured to receive a digital code that enables and disables the high efficiency mode of operation for a variable number of the plurality of CDAC cells, and based on the digital code, the CDAC cell activates a switch that reduces the impedance of the CDAC cell in an off mode.

3. The mobile communication device of claim 1, wherein the optimization component comprises a logic device including a first input coupled to a first input of the CDAC cell and a second input that receives a high efficiency enable signal to activate the high efficiency mode of operation based on a digital code.

4. The mobile communication device of claim 1, wherein the CDAC cell comprises a logic device including an output connected to an input of a driver, the driver comprising an output that is coupled to an input of an output capacitor connected to the transformer.

5. The mobile communication device of claim 4, wherein the optimization component is connected to the output capacitor via a charging node.

6. The mobile communication device of claim 4, wherein the logic device of the CDAC cell is coupled to another logic device of the optimization component that is configured to control a PMOS transistor that is connected to a charging node of the output capacitor and a supply voltage to increase the power efficiency of the CDAC cell by reducing the impedance of the CDAC cell in a power amplifier, in response to being in the high efficiency mode of operation and the CDAC cell being powered off.

7. The mobile communication device of claim 1, wherein the CDAC cell is configured to operate in an on mode and an off mode based on a cell enable signal and a driver size of the plurality of CDAC cells for a power output is determined via the cell enable signal.

8. The mobile communication device of claim 1, wherein the CDAC cell comprises a first differential signal path comprising a first output capacitor connected to a transformer and a second differential signal path comprising a second output capacitor connected to the transformer, and the optimization component is coupled in parallel to both the first differential signal path and the second differential signal path.

9. The mobile communication device of claim 8, wherein the optimization component comprises a first enhancement component and a second enhancement component, wherein the first enhancement component is coupled to a first differential signal path at a first charge node connected to an input of a first output capacitor and at a first logic device, and the second enhancement component is coupled to a second differential signal path at a second charge node connected to an input of the second output capacitor.

10. A method for a communication system comprising:
providing, via a plurality of capacitive digital analog converter (CDAC) cells of a power amplifier, power signals along a signal path;
in response to an optimization component that is coupled to a CDAC cell of the plurality of CDAC cells operating in a high efficiency enable mode and the CDAC cell being powered off in an off mode, increasing a power efficiency by at least one of: reducing an impedance to ground in a first enhancement component or impedance to supply in a second enhancement component of an output capacitor of the CDAC cell; and
activating a first transistor switch along a first optimization path of the optimization component to couple a supply voltage to a first charge node coupled to the output capacitor along a first differential path of the CDAC cell.

11. The method of claim 10, further comprising:
receiving a high efficiency enable signal at a first logic gate along the first optimization path of the optimization component while the CDAC cell does not receive an enable signal.

12. The method of claim 11, further comprising:
receiving the high efficiency enable signal at a second logic gate along a second optimization path of the optimization component while the CDAC cell does not receive the enable signal in an off mode; and
activating a second transistor switch along the second optimization path of the optimization component to couple a ground to a second charge node coupled to another output capacitor along a second differential path of the CDAC cell.

13. The method of claim 10, further comprising:
receiving a digital code that enables the high efficiency enable mode in the optimization component and disables the CDAC cell while enabling at least one other CDAC cell of the plurality of CDAC cells for a particular driver size to generate the power signals along the signal path.

* * * * *